United States Patent Office 2,830,400
Patented Apr. 15, 1958

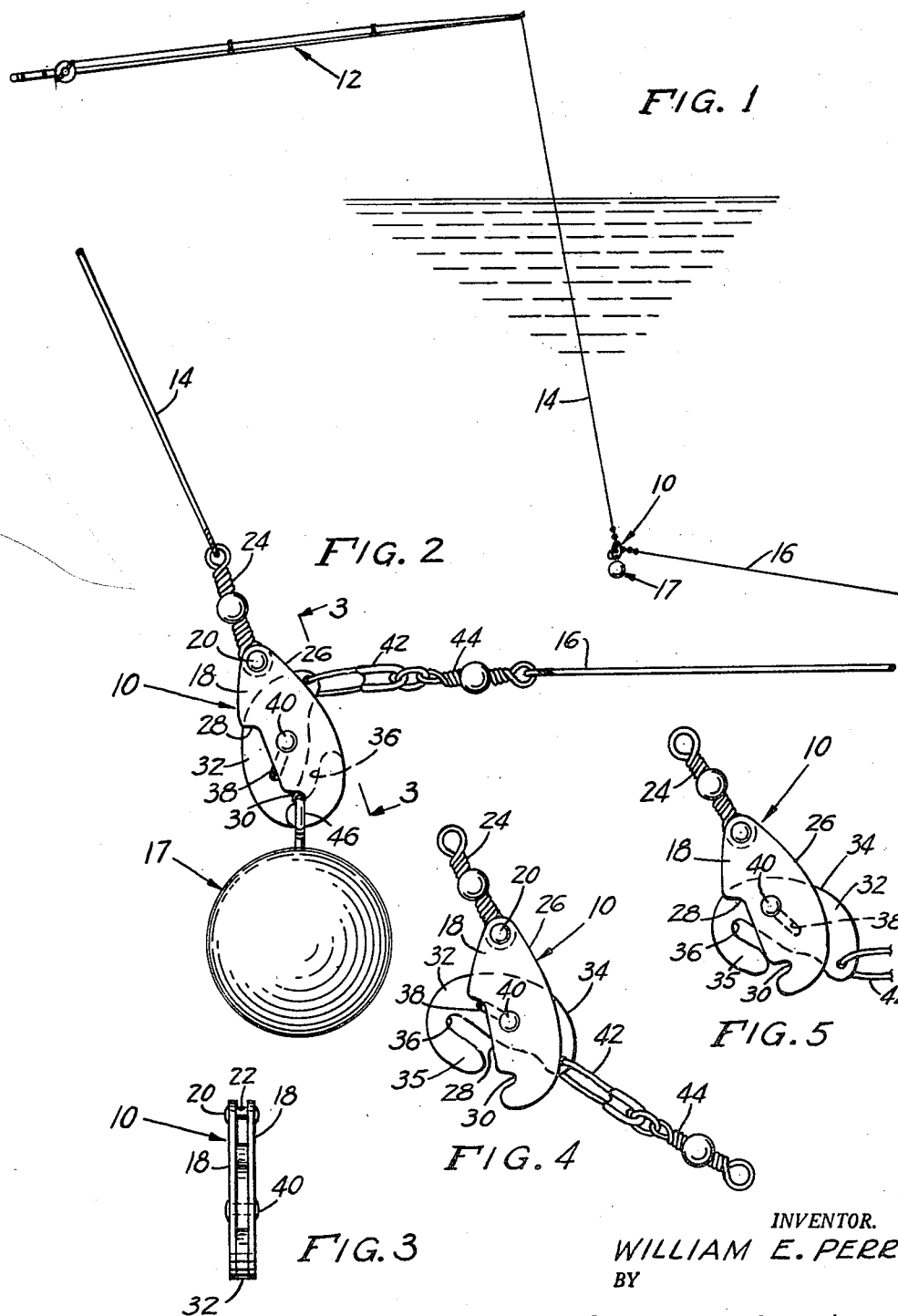

2,830,400

SINKER RELEASE

William E. Perry, Oakland, Calif.

Application July 8, 1955, Serial No. 520,778

3 Claims. (Cl. 43—43.12)

In certain types of fishing operations, it is desirable to effect release of a sinker when a strike occurs. The present invention is a device for this purpose, and while it is not broadly new to provide means for releasing a sinker in these circumstances it is proposed in accordance with the present invention to provide a generally improved device of this type, having relatively pivoted components so formed and arranged as, when the device is connected between a line and leader, to normally insure the suspension of the sinker from the device in such manner as to insure that it will be maintained against accidental release, while at the same time insuring swift and full release of the sinker responsive to pull exerted on the leader by a fish striking at the bait.

Heretofore, devices of this type have been relatively complex in construction and/or may require spring and other means to insure proper functioning. Complexity of construction is undesirable per se, of course, in devices of this type, and the use of springs has the disadvantage that the tension of the spring opposes the pull exerted on the line by the striking fish, reducing the sensitivity of the fishing equipment to strikes, so that the angler is not made fully and immediately aware that a fish is on the line.

To eliminate the difficulties which have heretofore persisted, it is proposed in accordance with the present invention to provide a device as stated in which, first of all, the device will comprise only three main components, these being a line-connected swivel, a two piece body portion connected to said swivel, and a blade slidably, pivotally connected to said body portion and adapted for connection to a leader. The blade and body portion have a cooperating hook and notch, respectively, so interrelated as to normally hold a depending sinker connected to the device, with the blade pivoting to a sinker-releasing position responsive to pull exerted on the leader by a striking fish. In carrying out the invention it is proposed, and is an important feature, that the gravitational pull of the sinker on the device provides the force for maintaining the body portion and blade in their sinker-engaging positions. The release of the sinker is effected entirely by a pull on the leader by a striking fish, which pull by the fish is of a value or force greater than the gravitational pull of the sinker upon the blade, thus eliminating the use of springs or equivalent means.

Other objects are to cause the component parts to be automatically held in open position whenever a fish is landed, to facilitate the reloading of the device with a new sinker; to facilitate the manufacture of the device at a minimum of cost; to provide a rugged device of the type stated which will be efficiently usable over a long period of time; to insure disposition of the line, leader, and sinker in positions, while awaiting a strike, in which they will not interfere with one another; to provide for maximum sensitivity to a strike; and to so design the device as to permit it to be manufactured entirely from non-corrosive materials, such as non-ferrous metals.

Other objects will appear from the following description, the claims appended thereto, and from the annexed drawing, in which like reference characters designate like parts throughout the several views, and wherein:

Figure 1 is a view showing the device in use;

Figure 2 is an enlarged side elevational view of the device with the sinker in held position;

Figure 3 is an edge view of the device as seen from line 3—3 of Figure 2;

Figure 4 is a side elevational view showing the component parts in sinker releasing position; and Figure 5 is a view showing the final position of the parts, following release of the sinker.

The device 10 constituting the present invention has been shown in Figure 1 in association with a conventional fishing rod 12, from which extends a line 14, the device being connected between said line 14 and a leader 16 having at its free end a lure, live bait, or the like, not shown.

While awaiting a strike, the device provides a support from which is suspended a conventional weight or sinker 17 of a particular, selected size.

Constituting one of the three main components of the device is a body portion comprising a pair of identical, laterally spaced, flat side plates 18 in parallel planes, formed of non-ferrous metal or other non-corrosive material. The plates have side edges converging toward the upper ends of the plates, so that the upper end portions of the plates may be appropriately considered as being of tapered configuration. In the upper portions of side plates 18 there are formed transversely aligned openings receiving a rivet 20 the intermediate portion 22 of which may be slightly enlarged in diameter to provide shoulders spacing the side plates apart. It will be understood, in this connection, that any suitable construction may be employed to insure that the side plates will be held in spaced relation not only at their upper ends, but also at other portions of their areas, and for example, in some commercial embodiments a ring or sleeve may be employed as a spacer, receiving the rivet and interposed between the side plates.

The rivet is employed for the purpose of connecting to the upper end of the body portion one end of a conventional swivel 24, to the other end of which is connected the line 14.

The trailing longitudinal edge 26 of the body portion is curved over its full length, while the opposite longitudinal edge is formed with a longitudinal recess 28 extending from a location slightly above the center point of the body portion to the lower end thereof. Adjacent the lower extremity of the recess 28, the wall thereof is provided with a relatively shallow, flaring notch 30.

Interposed between the side plates 18, and fulcrumed upon the body portion, is a flat blade 32 also of non-ferrous metal or other non-corrosive material, said blade having a forward longitudinal edge 34 curved throughout its length. The other longitudinal edge of the blade 32 is generally straight, though as shown, it may be slightly curved outwardly intermediate its ends. At the lower end of the blade 32 there is provided a hook shaped, upwardly projecting, elongated extension 35 defining a deep recess 36 opening oppositely to the notch 30 adjacent the lower end of the device.

Extending longitudinally of the blade, and disposed substantially centrally thereupon, is a slot 38, receiving a connecting rivet 40 providing a pivot pin, said rivet extending through circular openings formed in the side plates 18, which openings would be of a diameter approximating that of the shank or rivet.

At its upper end, blade 32 has a nose aperture to receive a snap-type clip 42, to which is connectable a swivel 44. These two parts are per se conventional, and if desired, other types of connecting means may be employed for attaching the leader 16 to the blade 32.

When the blade and body portion are relatively pivoted about their common axis 40 to the Figure 2 position thereof, the notch 30 and recess 36 are in registration at the inner end of the recess, so as to permit extension therethrough of an eye 46 of the sinker 17. The device is usable for any of various types of fishing operations, and according to the kind of fish angled for, the weight of the sinker would be correspondingly selected. The illustrated device has been used to advantage for example, in salmon trolling, and under these circumstances, the weight selected might be from one to four pounds. Smaller weights, and smaller sizes of sinker releases, would be employed for other kinds of fishing, in which the fish sought generally run smaller in size than salmon.

In any event, when the sinker is attached to the device in the manner shown in Figure 2, the gravitational pull thereof upon the device will tend to swing the blade 32 counterclockwise about pivot 40 to the Figure 2 position thereof, that is, to an upright position with the nose thereof disposed upwardly and the hook-provided end disposed at the lower extremity of the sinker release device. The leader 16 trails rearwardly from the device, with the line 14 extending upwardly at an angle of inclination which will depend upon the speed of the boat during the trolling, the weight of the sinker and other factors. At all times, however, while awaiting a strike, the weight will exert a gravitational pull upon the blade 32, holding the blade upright and hence causing the recess 36 to be disposed almost vertically, in an upwardly opening position, thus to insure the retention of the sinker upon the device under these circumstances.

When a fish strikes, the pull thereof in striking is at right angles to the direction of the line, and the strike can be immediately seen or felt by the angler as the force thereof is not absorbed by a spring as in various sinker release devices previously conceived. At the same time, a strong rearward pull is exerted through the leader 16 and connecting elements 42, 44 upon the upper end of the blade 32, and this immediately causes the blade 32 to swing relative to the body portion, in a clockwise direction about pivot 40, tipping the blade to the Figure 4 position thereof. The blade swings through slightly more than 90 degrees about its pivot as will be noted by comparison of Figures 2 and 4, and this will now dispose the recess 36 clear of the body portion, in an inclined, downwardly opening position. The eye 46 of the sinker is thus free to slide along the wall of the recess 36, the sinker dropping off the device completely as soon as the strike occurs, assuming, of course, that the force of the strike is of a value sufficient to overcome the gravitational force exerted upon the blade 32 by the weight.

The fish can now be played without interference from the sinker, which has been released and has dropped to the bottom.

With the sinker released, continuing pull upon the blade will cause the pivot pin or rivet 40 to travel to the other end of the slot 38 as will be noted by comparison of Figures 4 and 5. The purpose of the slot is to permit the blade a full swinging movement over the ends of the side plates without friction or contact with said side plates, and it will be understood that in making various sizes of the device, the length, position, or shape of the slot 38 may be changed as necessary.

The arrangement illustrated permits the tripping of the device to occur only when the fish is of a size sufficient to effect a pull upon the leader 16 of a value sufficient to overcome the gravitational pull on the blade 32 exerted by a sinker of a particular weight.

When the fish has been landed, the component parts will be automatically disposed in either their Figure 4 or Figure 5 positions, since they are maintained in these positions whenever pull on the leader is counter to the resistance offered by the line 14. The device is thus automatically readied for reloading, and the reloading can be accomplished with one hand, by mere placement of another sinker on the hook 35, resulting in the sinker swinging the blade 32 to its Figure 2 position, readying the device for further use.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A device adapted for connection between a fishing line and leader, to support a sinker in a normally depending position and to release said sinker responsive to a pull exerted on the leader by a striking fish, comprising: a pair of laterally spaced flat side plates formed identically to one another and having upper and lower ends, said plates being formed adjacent their lower ends with laterally opening notches; means at the upper ends of the side plates for connecting the same to a fishing line; and a blade extending in the space between the side plates, said blade being adapted at one end for connection to a leader, said end of the blade projecting beyond the peripheries of the side plates normally adjacent said upper ends, the blade being formed at its other end with an elongated, hook-like extension projecting upwardly in the normal position of the blade and defining a correspondingly elongated, normally upwardly opening recess adapted to receive a portion of a sinker, said blade being fulcrumed intermediate its ends upon the side plates, for swinging movement of the blade to its normal position responsive to gravitational pull exerted upon the second named end thereof by said sinker, said blade swinging an angular distance sufficient for projection of the extension in a downward direction, to a position in which the recess opens downwardly for release of the sinker responsive to pull exerted at the other end of the blade by a striking fish, said blade in the normal position thereof being disposed with its recess in registration with the notch, for confining of said portion of the sinker in the notches and recess in the first position of the blade, said blade being adapted to turn through said angular distance in a path wholly clear of said body portion.

2. A device adapted for connection between a fishing line and leader, for normally supporting a sinker in a depending position and for releasing said sinker responsive to force exerted upon the device by a striking fish, comprising: a pair of flat, relatively elongated, identically formed side plates having upper and lower ends, said plates being formed with transversely aligned openings intermediate their ends and being formed adjacent their upper ends with a laterally extending opening and with transversely aligned notches adjacent their lower ends; means at the upper ends of the side plates for connecting the same to a fishing line; a blade extending within the space between the side plates, said blade having a slot-like center opening registering with said openings of the side plates, the blade at one end projecting beyond the peripheries of the side plates normally adjacent said upper ends and being adapted at said one end for connection to a leader, the blade being formed at its other end with a relatively narrow, deep recess opening in the direction of the first named end of the blade at one side of the blade, said recess normally opening upwardly and opposing said notches, the recess registering at its inner end with the notches in the normal position of the blade, whereby, by gravitational pull exerted on the blade by the supported sinker, said blade will swing to and will be retained in the normal position thereof; and pivot means extending through the center opening of the blade and through said openings of the side plates, for slidably and pivotally mounting the blade upon the side plates, said center opening being substantially in alignment longitudinally thereof with the connection to the leader whereby, or exertion or pull on the leader-connected end of the blade in a substantially horizontal direction by a striking fish, said blade will pivot about its axis and will be bodily shifted laterally to tilt the same to a second position, said blade in the second position thereof being disposed with its recess opening downwardly, clear of said notches, for gravitational release of the sinker, said blade during its lateral shifting and pivotal movement moving from its normal to its second position in a path wholly clear of said body portion.

3. For connection between a fishing line and leader, a device for dependingly supporting a sinker and for releasing the same responsive to a pull on the leader by a striking fish, comprising: an elongated body portion having at one end means to connect a line thereto and formed adjacent its other end with a laterally opening notch having a bottom wall sloping downwardly and outwardly of the body portion, said body portion including a pivot pin intermediate its ends and said means, pivot pin and notch being in substantial alignment longitudinally of the body portion; and an elongated blade having a longitudinal slot intermediate its ends receiving the pivot pin for swinging movement of the blade on the pivot pin and for sliding of the blade in the direction of its length, said blade having means to connect a leader thereto at one end of the blade corresponding to the line-connected end of the body portion, said means of the blade being aligned with the length of the slot longitudinally of the blade, the blade including at its other end an elongated, hook-like extension projecting toward said means of the blade along one side of the blade, said extension being curved about the pivot axis of the blade and being overlapped with the body portion in one position of the blade to releasably, dependingly support a sinker beyond said other end of the blade with the sinker engaged in said notch so as to gravitate along the sloped bottom wall of the notch on swinging of the blade to a second position through an angular distance sufficient to dispose the extension out of overlapping relation with the body portion in position projecting downwardly to disengage the sinker, said extension in its upwardly projecting position being disposed for swinging of the blade to said one position of the blade, said means of the body portion and blade being in closely spaced relation at said one end of the body portion in said one position of the blade with the pivot pin at one end of the slot, the blade when in its second position being disposed for movement of the pivot pin to the other end of the slot responsive to a continued pull on the leader.

References Cited in the file of this patent

UNITED STATES PATENTS

| | | |
|---|---|---|
| 1,033,464 | Pomeroy | July 23, 1912 |
| 1,576,197 | Kuffel et al. | Mar. 9, 1926 |
| 1,786,523 | Doering | Dec. 30, 1930 |
| 2,426,099 | Hershowitz | Aug. 19, 1947 |
| 2,799,115 | Reus | July 16, 1957 |